June 17, 1952 C. M. HINES 2,601,140
WHEEL SLIDE INDICATING APPARATUS
Filed Jan. 25, 1950
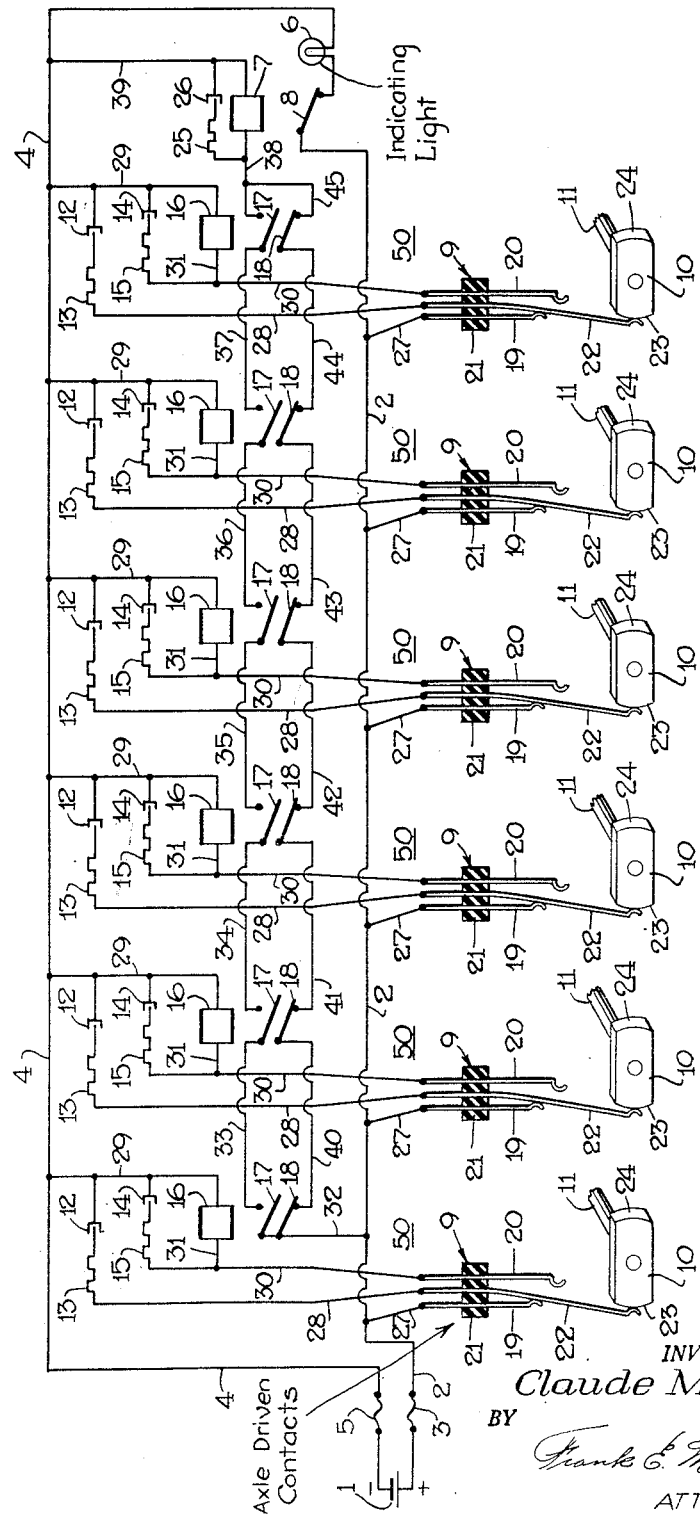
INVENTOR.
Claude M. Hines
BY
Frank E. Miller.
ATTORNEY Patented June 17, 1952

2,601,140

UNITED STATES PATENT OFFICE 2,601,140

WHEEL SLIDE INDICATING APPARATUS

Claude M. Hines, Verona, Pa., assignor to Westinghouse Air Brake Company, a corporation of Pennsylvania Application January 25, 1950, Serial No. 140,451

7 Claims. (Cl. 177—311)

This invention relates to control apparatus and more particularly to apparatus adapted to be associated with and responsive to rotation of a rotary member such as a wheel, for a desired indicating and control purpose.

More specifically, there is always the possibility of the driver wheels of a diesel type locomotive becoming locked against rotation due to seizure of bearings and particularly the bearings of the driving traction motor. Such seizure may occur while the locomotive is running or even after the locomotive has been stopped. In either case, if the wheels do not turn when the locomotive is in motion, flat spots will develop in the tread of the wheels necessitating costly repairs or replacement. On the other hand, if the wheels start to slide with the locomotive runnihg, derailment of the locomotive is possible, with interruption of schedules, possible traffic on other lines, and expense to place the locomotive back on the track. Thus, the desirability of means for warning the engineer of the locomotive of a sliding wheel is very apparent in order to minimize danger and avoid such other difficulties as above mentioned.

The principal object of the invention is therefore the provision of apparatus for indicating to the engineer of a locomotive when a driver wheel starts to slide or is held against rotation, in order that he may promptly take such action as necessary to minimize damage and avoid difficulties such as above mentioned.

Other objects and advantages will become apparent from the following more detailed description of the invention.

According to the invention I attain these objects by associating with each driving wheel of the locomotive a speed responsive arrangement, all of which arrangements cooperate to control an engineer's signal device in such a manner that if any wheel of the locomotive ceases or substantially ceases rotation while the locomotive is running above a chosen low speed or fails to turn upon starting the locomotive, then and only then will the signal device operate to warn the engineer of the conditions.

In the accompanying drawing the single figure is a diagrammatic view of my novel apparatus.

Description

As shown in the drawing, the apparatus embodying the invention comprises a supply of electric current such as a battery 1, battery supply and return wires 2 and 4 extending through the locomotive and connected to opposite terminals of said battery through fuses 3 and 5 respectively, a wheel slide indicating and signalling means such as a lamp 6 which will be located on the locomotive for observation by the engineer, and a signal relay 7 with a contact member 8 for controlling lighting of said lamp. Associated with each of the axles (not shown) of the locomotive is a basic unit 50 comprising a single-pole double throw switch 9, a cam 10 connected to a cam shaft 11 for controlling said switch, a condenser 12 connected in series relationship with a resistor 13, a condenser 14 connected in series with a resistor 15, and a relay 16 connected in parallel with the series combination of condenser 14 and resistor 15, said relay having contact members 17 and 18.

Each of the single-pole double throw switches 9 comprises two flexible resilient contact arms 19 and 20 suitably mounted in an insulating block or base 21 with a third contact arm 22 interposed therebetween in such a manner as to engage the contact arms 19 and 20 alternately upon oscillatory movement of said third contact arm 22. Each switch 9 further comprises a rotary cam 10 arranged to cooperate with the respective arm 22 to effect oscillation thereof.

Each cam 10 may be of any suitable type such as having several actuating surfaces depending on the frequency of oscillation of contact arm 22 that is desired. However, the cam illustrated herein is shown as a simplified cam having two actuating surfaces 23 and 24 each adapted to engage the contact arm 22 once for each complete revolution of the cam 10, for thus causing the contact arm 22 to engage each of the contact arms 19 and 20 twice for every complete revolution of the cam 10. Each cam shaft 11 may constitute or be connected by any suitable means (not shown) to a driving axle (not shown) of the locomotive in a manner such that said shaft and thereby the respective cam 10 will rotate as said axle and its associated wheels rotate.

For purposes of description hereinafter, the normal position of each cam 10 will be assumed to be the position wherein neither of the two actuating surfaces 23 and 24 are in engagement with the respective contact arm 22.

The signal relay 7 is illustrated herein as having only one contact member 8, but may have other contact arms for connecting or disconnecting various indicating means. A time delay circuit consisting of a serially arranged resistor 25 and condenser 26 is connected in parallel with the signal relay 7 for a purpose described hereinafter.

Operation

All of the basic units 50 operate in a similar manner as will now be explained. In each unit 50 the switch 9 operates when the locomotive is in motion such that when either of the cam actuating surfaces 23 or 24 engage the contact arm 22, a circuit is completed from the battery 1 by way of the supply wire 2, wire 27, the contact arm 19 of switch 9, the contact arm 22, wire 28, resistor 13, condenser 12, wire 29 and the return wire 4 to the battery 1 for thereby charging the condenser 12. As the cam 10 revolves after completing the circuit just described, the contact arm 22 moves out of engagement with the cam actuating surface with which it was engaging and assumes its normal position, previously defined, breaking said circuit and wherein the contact arm 22 engages the contact arm 20 thereby completing a circuit for discharging the condenser 12 to energize the winding of relay 16 to cause the contact member 17 and 18 of said relay to assume their respective picked-up positions in which contact member 17 will be closed and contact member 18 will be opened, and also to charge the condenser 14. These circuits are traced as follows: the discharging condenser 12, resistor 13, wire 28, contact arm 22 of switch 9, contact arm 20, wire 30 wire 31, the winding of relay 16 and wire 29 for energizing relay 16; and the parallel circuit from wire 30 to resistor 15, condenser 14 and wire 29 for charging the condenser 14 with current discharged from condenser 12. Continued rotation of the cam 10 will bring another one of the cam actuating surfaces 23 or 24 into contact with and operate contact arm 22 to disengage from the contact arm 20 and engage the arm 19, thus again completing the circuit previously described for charging the condenser 12. Simultaneous with this charging of condenser 12, the condenser 14 will discharge through the loop circuit consisting of resistor 15, wire 30, wire 31, the winding of relay 16 and wire 29 to thereby maintain relay 16 energized and in its picked-up position and the contact member 17 closed for a length of time governed by the predetermined values of the resistor 15, the discharging time of condenser 14 and the resistance of the winding of relay 16.

It can thus be seen, that in each of the basic units 50 the energization of the winding of relay 16 is dependent upon the speed of operation of the switch 9 which in turn is dependent upon the speed of rotation of the cam 10 and thus of the respective wheel of the locomotive connected thereto. This is due to the fact that it is the current discharging from either of the two condensers 12 and 14 (dependent on the position of the contact arm 22) that maintains the relay 16 energized and the contact members 17 and 18 picked-up. If the speed of rotation of the cam 10 decreases sufficiently or stops, due to wheel slip, for a length of time long enough for condenser 14 to discharge completely before the current discharged from condenser 12 is able to energize the winding of relay 16, or long enough for both the condensers 12 and 14 to completely discharge (as would be the case if the contact arm 22 ceased its oscillatory motion while engaging contact arm 20), the winding of relay 16 will become deenergized and the contact members 17 and 18 will be dropped out.

With all of the relays 16 energized so that their respective contact members 17 and 18 are in their picked-up positions, as they will be if there is not cessation of rotation of the respective cam and locomotive wheel, a circuit will be completed from the battery 1 by way of the battery supply wire 2, wire 32, each of the closed contacts 17 which are interconnected by the wires 33, 34, 35, 36 and 37 to wire 38, the winding of relay 7 and the parallel circuit through resistor 25 and condenser 26 to wire 39, battery return wire 4 and the battery 1, for thereby charging the condenser 26 and energizing the winding of relay 7, thus picking up the contact member 8 of the said relay.

It is the lighting of lamp 6 that indicates to the operator that there is a wheel sliding, while if the lamp 6 is not lighted it indicates that no wheels are sliding. With winding of relay 7 energized, as just described, so that its contact member 8 is picked up, the contact member 8 is in its open position whereby the light 6 will be extinguished thus effecting a visual indication to the operator that no wheels are sliding as will be explained hereinafter. If, however, the contact 8 of relay 7 is in its closed position, a circuit will be completed from the battery 1 by way of the battery supply wire 2, the closed contact member 8, the indicating lamp 6, battery return wire 4 to the battery supply 1, thereby lighting the indicating lamp 6.

It is thus seen that the indicating means (lamp 6) is dependent on the energization of the winding of relay 7 to maintain the contact member 8 picked up to indicate that no wheels on the locomotive are sliding, and the energization of said relay is dependent upon the completion of the circuit previously described which includes the contact members 17 of the relays 16 in their picked up or closed positions. As was previously mentioned, the maintaining of the relays 16 energized so that their respective contact members 17 are maintained in their picked up positions for completion of the just mentioned circuit is dependent on the rotational speed of the cam 10 and thus the wheels of the locomotive, therefore the resulting indication of the lamp 6 effected by the relay 7 is dependent on the rotation of the cams 10.

It should now be evident that should any of the driving wheels of the locomotive slide or tend to slide, causing the rotation of the respective cam 10 to decrease to a predetermined speed, it will effect deenergization of the respective relay 16 which in turn after a time delay controlled by the discharging of condenser 26 through the loop circuit including resistor 25, wire 38, relay 7 and wire 39, will cause the contact member 8 of said relay to drop out thereby effecting the completion of the circuit for energizing the indicating lamp 6 to indicate to the operator that a wheel is sliding, or tending to slide.

It is not desired that the lamp 6 light up when all of the wheels of the train decelerate normally and finally cease rotation when the locomotive is being brought to a stop. As can be seen, with no wheel sliding, all of the wheels will gradually decrease their speed of rotation in unison until the resulting speed of rotation of the cams 10 is insufficient to effect a rapid enough oscillatory motion of the contact arms 22 that would enable the relays 16 to remain energized and maintain the contact members 17 and 18 in their respective picked-up positions as was previously explained. If all of the relays 16 become deenergized at the same time in stopping the locomotive, all of the contact members 18, will drop to their respective closed positions simultaneously thereby completing an alternate circuit for energizing the relay 7 by way of the battery supply wire 2, wire 32, closed contacts 18 of the respective relays 16 which are interconnected by wires 40, 41, 42, 43, and 44 to wire 45 and wire 38 to the relay 7, and wire 39 to the battery return wire 4. Thus the lamp 6 will remain out under the condition just described, as desired.

If for any reason the contact member 17 of any one or more of the relays 16 drops out slightly ahead of the others while the locomotive is stopping, the condenser 26 by discharging through the loop circuit, previously described, will maintain relay 7 picked up during the short interval of time required for all of the relays 16 to drop out whereby the lamp 6 will remain out, as desired. Similarly, the current discharged by condenser 26 will maintain the relay 7 energized and the contact member 8 picked up while all the relays 16 are being energized again after the locomotive is started in motion after stopping, thus, the lamp 6 will remain out during normal starting of the locomotive, as desired.

It will now be seen that the indicating lamp 6 will be out with no wheels on the locomotive sliding while the locomotive is in motion, and will remain out while the locomotive is stopped and also when the locomotive is started if all wheels turn. The indicating lamp will be lit when and only when a locomotive wheel tends to slide while the locomotive is in motion or ceases to turn on starting the locomotive.

It will be apparent from the above discussion that if in attempting to start the locomotive any of the wheels start to spin relative to another (as might happen with spots of grease or ice on the rails) the apparatus will cause the indicating lamp 6 to indicate such condition.

In the event of failure in any one of the basic units 50 which would interrupt the circuit for energizing relay 7, resultant lighting of the indicating lamp 6 will indicate the lack of integrity of the wheel slide indicating equipment itself, as desired.

Having now described the invention, what I claim as new and desire to secure by Letters Patent, is:

1. Apparatus for indicating a change of speed of rotation of any one of a plurality of rotatable elements relative to another, said apparatus comprising a source of electric current, a signal device an electro-responsive device for controlling the operation of said signal device, a plurality of electro-responsive means, one for each of said rotatable elements, operative cooperatively, in one position to effect energization of said electro-responsive device when the said rotatable elements are rotating at the same speeds, and operative cooperatively in a second position to effect energization of said electro-responsive device when there is a simultaneous cessation of rotation of the said rotatable elements, and operative individually in said one position to effect deenergization of said electro-responsive device when there is a cessation of rotation of any of the said rotatable elements relative to another, and operative individually in said second position to effect deenergization of said electro-responsive device when there is rotation of any one of said rotatable elements relative to another after the other of said rotatable elements have ceased rotation, and a plurality of means, one for each of said rotatable element, each being responsive to a change in speed of rotation of the respective corresponding rotatable element relative to another to effect operation of the corresponding electro-responsive means.

2. Apparatus for indicating a change of speed of rotation of any one of a plurality of rotatable elements relative to another, said apparatus comprising a source of electric current, a signal device, an electro-responsive device for controlling the operation of said signal device, a plurality of electro-responsive means, one for each of said rotatable elements, operative cooperatively in one position to effect energization of said electro-responsive device when the said rotatable elements are rotating at the same speeds, and operative cooperatively in a second position to effect energization of said electro-responsive device when there is a simultaneous cessation of rotation of said rotatable elements, and operative individually in said one position to effect deenergization of said electro-responsive device when there is a cessation of rotation of any of said rotatable elements relative to another, and operative individually in said second position to effect deenergization of said electro-responsive device when there is rotation of any one of said rotatable elements relative to another after the other of said rotatable elements have ceased rotation, and time delay means to effect energization of said electro-responsive device upon individual operation of said electro-responsive means, and a plurality of means, one for each of said rotatable elements, each being responsive to a change in speed of rotation of the corresponding rotatable element relative to another to effect operation of the corresponding electro-responsive means.

3. Signalling apparatus for a plurality of rotatable elements comprising an electro-responsive signal control device, a plurality of relays, one for each rotatable element, cooperative upon either simultaneous energization of all thereof or simultaneous deenergization of all thereof to effect energization of said signal control device and operative individually upon a change in the electrical condition of one thereof relative to another to effect deenergization of said signal control device, time delay means for delaying deenergization of said signal control device for a chosen period of time after said individual change in condition of said relays, and a speed responsive means for controlling each relay responsive to speed of rotation of the respective rotatable element.

4. Signalling apparatus for a plurality of rotatable elements comprising a signal control device, a source of electric current, a plurality of electro-responsive relays, one for each rotatable element, serially cooperative upon either energization or deenergization to connect said signal control device in circuit with said source of electric current and operative individually one relative to another to break said circuit, time delay means including a condenser connected in said circuit in parallel relation to said signal control device for holding said signal control device energized for a chosen interval of time after said individual operation of said relays, and means for controlling energization and deenergization of each of said relays comprising time delay means including a holding condenser connected in parallel relation to the respective relay, a third condenser, and means operative by rotation of the respective rotatable element for alternately connecting said third condenser in circuit with said source of current and said holding condenser.

5. Apparatus for signalling the asynchronous condition of any one of a plurality of normally synchronously rotatable elements, said apparatus comprising switch means for each of said rotatable elements, means for causing each of said switch means to be maintained in one position so long as the corresponding rotatable element rotates at a speed exceeding a certain speed and to be actuated to a second position when the corresponding rotatable element ceases to rotate, a first circuit established by the cooperative serial relation of all of said switch means while in the said one position thereof, a second circuit established by the cooperative serial relation of all of said switch means while in the said second position thereof, and electro-responsive signal means operatively energized responsively to establishment of either said one or said second circuit and operatively deenergized responsively to interruption of either the said one or the said second circuit by individual action of any one of said switch means.

6. Apparatus for signalling the asynchronous condition of any one of a plurality of normally synchronously rotatable elements, said apparatus comprising switch means for each of said rotatable elements, means for causing each of said switch means to be maintained in one position so long as the corresponding rotatable element rotates at a speed exceeding a certain speed and to be actuated to a second position when the corresponding rotatable element ceases to rotate, a first circuit established by the cooperative serial relation of all of said switch means while in the said one position thereof, a second circuit established by the cooperative serial relation of all of said switch means while in the said second position thereof, electro-responsive signal means operatively energized responsively to establishment of either said one or said second circuit and operatively deenergized responsively to interruption of either the said one or the said second circuit by individual action of any one of said switch means, and means for preventing operative deenergization of said electro-responsive signal means responsively to interruption of said one or said second circuit unless such interruption endures for longer than a certain length of time.

7. Apparatus for signalling the locked condition of any one of a plurality of driving wheels of a vehicle, said apparatus comprising switch means for each of said wheels, means for causing each of said switch means to be maintained in one position so long as the corresponding wheel rotates at a speed exceeding a certain speed and to be actuated to a second position when the corresponding wheel ceases to rotate, a first circuit established by the cooperative serial relation of all of said switch means while in the said one position thereof, a second circuit established by the cooperative serial relation of all of said switch means while in the said second position thereof, and electro-responsive signal means operatively energized responsively to establishment of either said one or said second circuit and operatively deenergized responsively to interruption of either the said one or the said second circuit by individual action of any one of said switch means.

CLAUDE M. HINES.

REFERENCES CITED

The following references are of record in the file of this patent:

UNITED STATES PATENTS

| Number | Name | Date |
|---|---|---|
| 2,118,483 | Woodman | May 24, 1938 |
| 2,333,210 | Stern | Nov. 2, 1943 |
| 2,335,984 | Wilson | Dec. 7, 1943 |
| 2,430,125 | Kipnis | Nov. 4, 1947 |
| 2,462,655 | McKenry | Feb. 22, 1949 |
| 2,472,526 | Frazee | June 7, 1949 |